(No Model.)
F. COOMER.
MECHANICAL MOVEMENT.
No. 463,100. Patented Nov. 10, 1891.
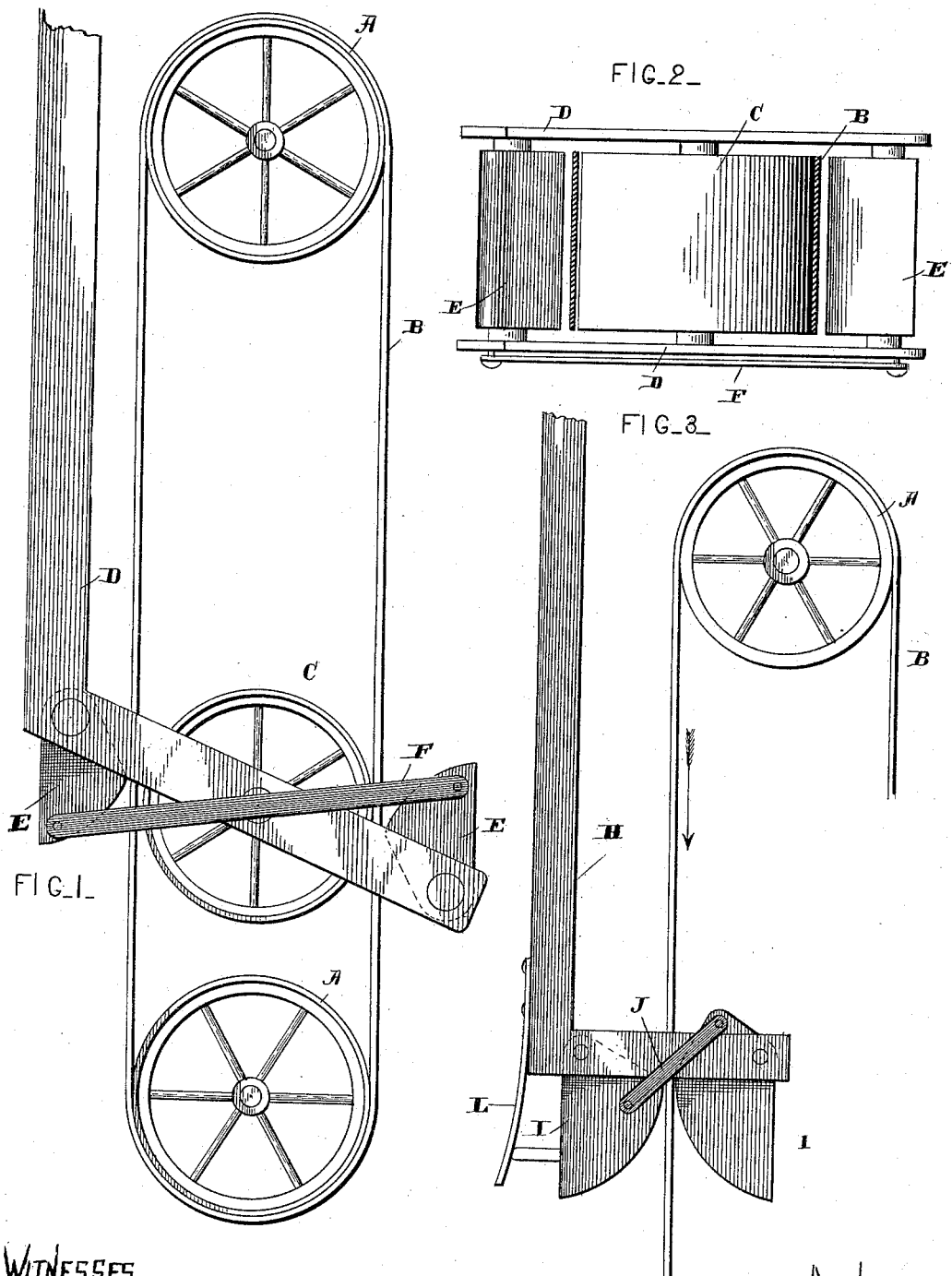
WITNESSES
Geo. E. Frech.
Roland H. Fitzgerald
INVENTOR
Fayette Coomer
per Lehmann Pattison
attys

UNITED STATES PATENT OFFICE.

FAYETTE COOMER, OF OWASA, IOWA.

MECHANICAL MOVEMENT.

SPECIFICATION forming part of Letters Patent No. 463,100, dated November 10, 1891.

Application filed June 8, 1891. Serial No. 395,534. (No model.)

*To all whom it may concern:*

Be it known that I, FAYETTE COOMER, of Owasa, in the county of Hardin and State of Iowa, have invented certain new and useful Improvements in Mechanical Movements; and I do hereby declare the following to be a full, clear, and exact description of the invention, such as will enable others skilled in the art to which it pertains to make and use it, reference being had to the accompanying drawings, which form part of this specification.

My invention relates to an improvement in mechanical movements; and it consists in the construction and arrangement of parts which will be fully described hereinafter, and particularly referred to in the claims.

The object of my invention is to convert a reciprocating or oscillating movement to a rotary one by means of a belt and a clutch mechanism, which is attached to the reciprocating mechanism for grasping the belt when moved in one direction, and to move freely over the belt when moved in the opposite direction.

Figure 1 is a side elevation of a mechanism which embodies my invention. Fig. 2 is an end view of the same. Fig. 3 is a slight modification.

A A represent two pulleys, which are journaled in suitable bearings, and B a belt, which passes around them and moves continuously in the same direction. Placed between the belt at any suitable point is a wheel C, which is adapted to turn in either direction and which is journaled between the two prongs of the reciprocating or oscillating rod or lever D. As here shown, the lower end of the rod D is bent at an angle and extends upon opposite edges of the belt, and pivoted between these ends of the said rod at opposite sides of the wheel C and outside of the belt are the cams E, which form clutches. The outer free ends of these clutches are connected by a rod F, which extends diagonally from one to the other, so that when one clutch is moved in one direction the other will be moved in the opposite one. The clutches may either be of the construction here shown or any other that may be preferred, so that they will alternately press the belt B tightly against the side of the wheel C and hold it sufficiently tight to cause the belt to move with the rod or lever D, when the wheel C and the clutches E are preferably made of the same width as the belt, so as to afford a large bearing or holding surface which will not slip in the slightest. When the rod D is moved toward the lower pulley, the clutch or clutches are made to force the belt B against the side of the wheel C and to take such a hold thereon that there is no possibility of slipping, and thus cause the belt to move in the same direction as the rod. As soon as the end of the stroke is reached and the rod begins to move in the opposite direction the left clutch, which was just moving the belt, moves back out of engagement with it and the rod F draws the clutch upon the right into contact with the belt, and the belt is thus made to continue its movement.

In case it is desired to use but one clutch, as shown in Fig. 3, the rod H has two clutches I journaled in its ends and only separated a slight distance from each other. The rod J connects the two clutches, as shown, and a spring L is used to force one of the clutches toward the belt. When the rod H makes its downward stroke, the spring L causes the clutch upon the left to be forced against the outer side of the belt, and the two clutches are made to clamp the belt between them, so that it is caused to move in the same direction as the rod. When the rod begins its reverse motion, the two clutches slip over the belt, being only held tightly against it by the spring L; but when the rod begins to move in the direction of the arrow the eccentric clutches are made to firmly grasp the belt between them.

Having thus described my invention, I claim—

1. A mechanism for converting motion, comprising a belt, a reciprocating rod, clutches placed upon each side of the belt and carried by the said rod, and a rod connecting the said clutches, whereby one operates the other, substantially as shown and described.

2. A mechanism for converting motion, comprising a belt, pulleys around which it passes, a reciprocating or oscillating rod, a wheel journaled between the lines of belt, two clutches placed upon opposite sides of the wheel, and a connecting-rod for causing the clutches to move in opposite directions, substantially as described.

In testimony whereof I affix my signature in presence of two witnesses.

FAYETTE COOMER.

Witnesses:
   GEORGE FISK,
   FRANCIS CARPENTER.